(12) United States Patent
Merswolke

(10) Patent No.: US 10,557,411 B2
(45) Date of Patent: Feb. 11, 2020

(54) COMPRESSED AIR ENERGY SYSTEM

(71) Applicant: Paul H. F. Merswolke, Bognor (CA)

(72) Inventor: Paul H. F. Merswolke, Bognor (CA)

( * ) Notice: Subject to any disclaimer, the term of this patent is extended or adjusted under 35 U.S.C. 154(b) by 0 days.

(21) Appl. No.: 16/242,476

(22) Filed: Jan. 8, 2019

(65) Prior Publication Data

US 2019/0136763 A1    May 9, 2019

Related U.S. Application Data

(63) Continuation of application No. 15/013,222, filed on Feb. 2, 2016, now Pat. No. 10,208,666.

(60) Provisional application No. 62/111,794, filed on Feb. 4, 2015.

(51) Int. Cl.
*F02C 6/16* (2006.01)
*F28D 20/00* (2006.01)

(52) U.S. Cl.
CPC .............. *F02C 6/16* (2013.01); *F28D 20/00* (2013.01); *F28D 2020/0047* (2013.01); *Y02E 60/15* (2013.01)

(58) Field of Classification Search
CPC ........ F15B 1/027; F15B 2201/42; F02C 6/16; Y02E 60/15; F28D 2020/0047
USPC ......................................................... 60/371
See application file for complete search history.

(56) References Cited

U.S. PATENT DOCUMENTS

| 4,100,745 | A  | 7/1978  | Gyarmathy      |
| 8,250,863 | B2 | 8/2012  | Bollinger et al. |
| 8,739,522 | B2 | 6/2014  | Anikhindi      |
| 9,938,896 | B2 | 4/2018  | Bannari        |
| 2005/0210878 | A1 | 9/2005 | Ashikian       |
| 2013/0232974 | A1 | 9/2013 | Nakhamkin      |
| 2013/0263585 | A1 | 10/2013 | Oppenheimer   |
| 2014/0199160 | A1 | 7/2014  | Merswolke      |
| 2014/0338318 | A1 | 11/2014 | Oppenheimer   |

FOREIGN PATENT DOCUMENTS

CA    2014161065 A1    10/2014

OTHER PUBLICATIONS

Highview Enterprises Ltd., Liquid Air Energy Storage (LAES), Highview Power Storage, 2014, Trafalgar Square, London.
Highview Enterprises Ltd., Liquid Air Energy Storage (LAES): Our processes, Highview Power Storage, 2014, Trafalgar Square, London.
Highview Enterprises Ltd., 5MW/15MWh Pre-Commercial Liquid Air Demonstrator, Highview Power Storage, 2014, Trafalgar Square, London.

(Continued)

*Primary Examiner* — Michael Leslie
(74) *Attorney, Agent, or Firm* — Norton Rose Fulbright Canada LLP

(57) ABSTRACT

Methods and associated systems for storing compressed air and extracting energy from the compressed air are disclosed. An exemplary method comprises: compressing air; storing the compressed air in a first storage tank at a first pressure; transferring the compressed air from the first storage tank to a second storage tank; storing the compressed air in the second storage tank at a second pressure lower than the first pressure; discharging the compressed air from the second storage tank; and extracting energy from the compressed air discharged from the second storage tank. The method may also comprise adding heat to the compressed air between the first storage tank and the second storage tank.

22 Claims, 11 Drawing Sheets

(56) References Cited

OTHER PUBLICATIONS

Isentropic, Energy Storage Systems, Isentropic Ltd., 2013, United Kingdom.
Isentropic, Key Technologies, Isentropic Ltd., 2013, United Kingdom.
Norton Rose Fulbright Canada LLP, Response to U.S. Office Action dated Apr. 18, 2018 re: U.S. Appl. No. 15/013,222.
United States Patent and Trademark Office, U.S. Office Action dated Apr. 18, 2018 re: U.S. Appl. No. 15/013,222.

COMPRESSED AIR ENERGY SYSTEM

CROSS-REFERENCE TO RELATED APPLICATION AND CLAIM OF PRIORITY

This application is a continuation of U.S. patent application Ser. No. 15/013,222 filed on Feb. 2, 2016, which claims priority from U.S. provisional patent application Ser. No. 62/111,794 filed on Feb. 4, 2015, which is herein incorporated by reference.

TECHNICAL FIELD

The disclosure relates generally to systems for storing compressed air and extracting energy from the compressed air, and more particularly, to such systems comprising storage tanks for storing compressed air at different pressures and one or more heaters for adding heat to the compressed air at one or more locations in the systems.

BACKGROUND OF THE ART

Compressed air energy systems are known and are typically configured to produce and store compressed air in large volumes for use at a later time. Some existing systems can make use of off-peak (low cost) electrical power to compress air, store the compressed air and use the compressed air at a later time for generating electricity during peak (high price) electric usage times. In order to harvest as much of the excess energy available during off-peak times, existing systems typically make use of relatively large pressure vessels or underground caverns for storing the compressed air. The large pressure vessels and/or underground caverns used in existing compressed air energy systems require a large amount of space and be can be prohibitively expensive, hence not always suitable for some applications.

Improvement is therefore desirable.

SUMMARY

In one aspect, the disclosure describes a compressed air energy system for storing compressed air and extracting energy from the compressed air. The system comprises:

an air compressor;

a first storage tank connected to the air compressor for receiving compressed air from the air compressor and storing the compressed air at a first pressure;

a second storage tank connected to the first storage tank for receiving compressed air from the first storage tank and storing the compressed air at a second pressure;

a first pressure regulator operatively disposed between the first storage tank and the second storage tank, the first pressure regulator being configured to control a flow of compressed air from the first storage tank to the second storage tank to maintain the second pressure in the second storage tank lower than the first pressure in the first storage tank; and an energy extraction apparatus connected to the second storage tank and configured to extract energy from the compressed air discharged from the second storage tank.

In another aspect, the disclosure describes a method for storing compressed air and extracting energy from the compressed air. The method comprises:

compressing air;

storing the compressed air in a first storage tank at a first pressure;

transferring the compressed air from the first storage tank to a second storage tank;

storing the compressed air in the second storage tank at a second pressure lower than the first pressure;

discharging the compressed air from the second storage tank; and extracting energy from the compressed air discharged from the second storage tank.

Further details of these and other aspects of the subject matter of this application will be apparent from the detailed description and drawings included below.

DESCRIPTION OF THE DRAWINGS

Reference is now made to the accompanying drawings, in which.

DETAILED DESCRIPTION

The present disclosure relates to compressed air energy systems and associated methods for producing and storing compressed air and extracting energy from the compressed air at a later time. The compressed air may be produced and stored when energy production, by an electric utility (i.e. power company) for example, exceeds the demand and the energy from the compressed air may be extracted when the demand exceeds energy production. In some embodiments, the systems and methods disclosed herein may use a natural or renewable source of energy for compressing the air so that such energy may be harvested for future consumption. In various embodiments, the compressed air may be initially stored in one or more high-pressure tanks and subsequently transferred to one or more low-pressure tanks prior to being delivered to one or more energy extraction apparatus. In some embodiments, the construction of the high-pressure tank(s) may be more economical than conventional large pressure vessels or than the construction of underground caverns used in existing systems. Heat may also be added to the compressed air at one or more locations in the system to increase the amount of energy produced by the compressed air energy systems disclosed herein. In some embodiments, heat may be added to the compressed air at a location between the high-pressure tank(s) and the low-pressure tank(s).

Aspects of various embodiments are described through reference to the drawings.

Figure 1:
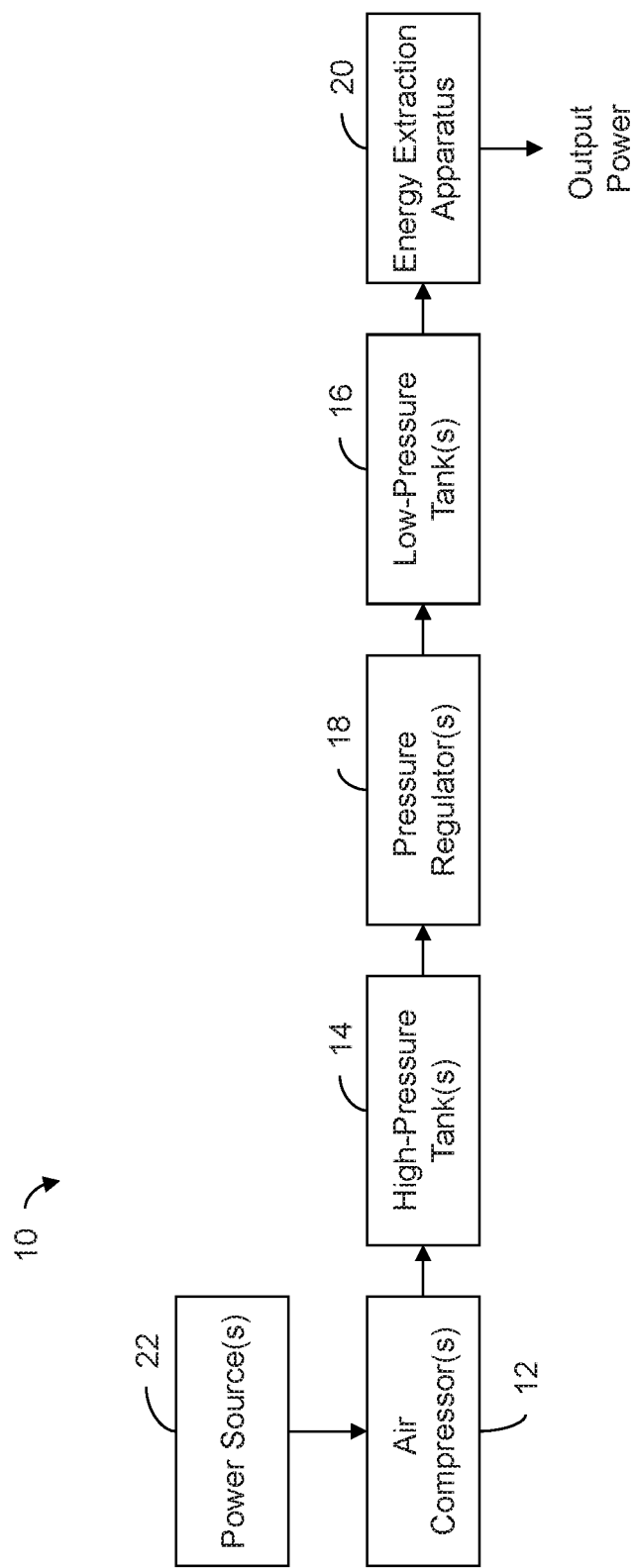
FIG. 1 is a schematic representation of an exemplary compressed air energy system according to one embodiment of the present disclosure.

FIG. 1 is a schematic representation of an exemplary compressed air energy system 10 according to one embodiment of the present disclosure. System 10 may be used for storing compressed air and extracting energy from the compressed air at a later time. System 10 may serve as a mechanical battery for storing energy that has been produced at relatively low cost and/or in excess of current demand for consumption at a later time. System 10 may comprise one or more air compressors (referred hereinafter as "air compressor 12"), one or more first (i.e., high-pressure) storage tanks (referred hereinafter as "HP tank 14"), one or more second (i.e., low-pressure) storage tanks (referred hereinafter as "LP tank 16"), one or more first pressure regulators (referred hereinafter as "pressure regulator 18") operatively disposed between HP tank 14 and LP tank 16 and one or more energy extraction apparatus 20 for extracting energy from the compressed air discharged from LP tank 16.

Air compressor 12 may be driven by one or more suitable sources 22 of input power. For example, air compressor 12 may be an electrically-powered compressor of known or other types. In some embodiments, air compressor 12 may be configured to produce compressed air at pressures of up to 3000 psi (20.7 MPa). For example, air compressor 12 may be of the type typically used to pressurize air to pressures of up to about 5000 psi (34.5 MPa). The type, size and number of air compressor(s) 12 may be selected based on the amount of power expected from power source 22 and also on the desired amount of compressed air to be stored for future use.

In various embodiments, power source 22 may include one or more renewable energy sources such as solar, wind, biofuel, hydro, biogas and/or fuel cell, for example. For example, power source 22 may comprise a wind turbine. In some embodiments, power source 22 may produce energy from fossil fuel(s) such as natural gas and/or coal. In some embodiments, power source 22 may include one or more nuclear reactors and/or one or more diesel generators. Alternatively or in addition, power source 22 may include electrical power from transmission and/or distribution lines (i.e., the electric grid) produced by known or other methods.

HP tank 14 may be connected to air compressor 12 for receiving compressed air from air compressor 12 and storing the compressed air at a first pressure. LP tank 16 may be connected to HP tank 14 for receiving compressed air from the HP tank 14 and storing the compressed air at a second pressure. The first pressure of the compressed air stored in HP tank 14 may be higher than the second pressure of the compressed air stored in LP tank 16. For example, in some embodiments, HP tank 14 may be configured to contain compressed air at the first pressure where the first pressure is at least about 1000 psi (6.9 MPa) or higher. The pressure values referenced in the present disclosure are absolute pressures. In some embodiments, HP tank 14 may be configured to contain compressed air at the first pressure where the first pressure is between about 1000 psi (6.9 MPa) and about 3000 psi (20.7 MPa).

In some embodiments, HP tank 14 may have a relatively simple and relatively inexpensive construction (i.e., lower capital cost). For example, in some embodiments, HP tank 14 may have a pipe configuration. For example, HP tank 14 may comprise one or more (e.g., carbon steel) pipes of the type typically used as gas pipelines. Such piping used for HP tank 14 may, for example, comprise piping having a nominal pipe size (NPS) of 32" (81.3 cm), 34" (86.4 cm), 36" (91.4 cm) or 38" (96.5 cm) sold under the trade name PIONEER PIPE. The use of conventional gas line piping configured to withstand the desired operating pressures as HP tank 14 may be relatively economical in comparison with other pressure vessels of larger diameters and/or underground caverns. Accordingly, it may be preferable to use a plurality of HP tanks 14 having such pipe construction in order to provide the desired storage capacity for compressed air at relatively higher pressures (e.g., 1000 psi to 3000 psi). In some embodiments, one or more HP tanks 14 may, for example, have a pipe configuration with an internal diameter of about 34 inches (86 cm) and a length of about 60 feet (18.3 m) so as to provide storage for about 6072 pound-mass (2754 kg) of compressed air at about 3000 psi (20.7 MPa).

Pressure regulator 18 may be operatively disposed between HP tank 14 and LP tank 16. Pressure regulator 18 may be configured to control a flow of compressed air from HP tank 14 to LP tank 16 to maintain the second pressure in the LP tank 16 lower than the first pressure in HP tank 14. Pressure regulator 18 may be of known or other types. LP tank 16 may be configured to contain compressed air at the second pressure where the second pressure may be below 1000 psi (6.9 MPa). For example LP tank 16 may be configured to contain compressed air at the second pressure where the second pressure may be higher than about 400 psi (2.7 MPa). For example, second pressure may be between about 470 psi (3.2 MPa) and about 570 psi (3.9 MPa). LP tank 16 may have a larger volume than one HP tank 14. LP tank 16 may be of cylindrical configuration but may have a larger diameter than a corresponding diameter of HP tank 14.

The compressed air discharged from LP tank 16 may be directed toward energy extraction apparatus 20. The decrease in pressure of compressed air is typically accompanied by a corresponding decrease in temperature. Consequently, the decrease in pressure may reduce the amount of energy available in the compressed. The use of LP tank 16 for storing compressed air at second pressure (e.g., less than 1000 psi) and supplying energy extraction apparatus 20 may entail a decrease (i.e., delta) in pressure and temperature that is less severe than would otherwise be encountered if energy extraction apparatus 20 was connected to and supplied directly from HP tank 14. The use of LP tank 16 for storing compressed air at an intermediate pressure between HP tank 14 and energy extraction apparatus 20 may provide the opportunity for heat to be added to the compressed air between HP tank 14 and energy extraction apparatus 20 so as to reduce the severity of the decrease in temperature that typically accompanies a decrease in pressure in the compressed air. In some embodiments, LP tank 16 may, for example, have an internal diameter of about 10 feet (3 m) and a length of about 40 feet (12 m) so as to provide storage for about 8,985 pound-mass (4075 kg) of compressed air at about 570 psi (3.9 MPa)

The size of LP tank 16 may be selected to provide a working volume of compressed air available to be released to energy extraction apparatus 20. The volume of LP tank 16 may be selected based on the specific application and process parameters. For example, the volume of LP tank 16 may be selected based on one or more factors including the capacity for adding heat to the compressed air in order to reduce the severity of the decrease in temperature associated with the decrease in pressure of the compressed air. The volume of LP tank 16 may also be selected based on the residence time of the compressed air desired in LP tank 16 before being discharged to energy extraction apparatus 20. In some embodiments, the volume of LP tank 16 may be larger than one of HP tanks 14. The volume of LP tank 16 may also be selected based on other factors including, fabrication costs, installation costs and the amount of space (i.e., real estate) available.

Energy extraction apparatus 20 may be connected to LP tank 16 and configured to extract energy from the compressed air discharged from LP tank 16. As explained further below in relation to FIG. 3 energy extraction apparatus 20 may be configured to extract energy from the compressed air and produce electricity from the extracted energy. The electricity produced by energy extraction apparatus 20 may be fed back into an electric grid to meet a demand of customers of an electric utility or used for another purpose.

Figure 2:
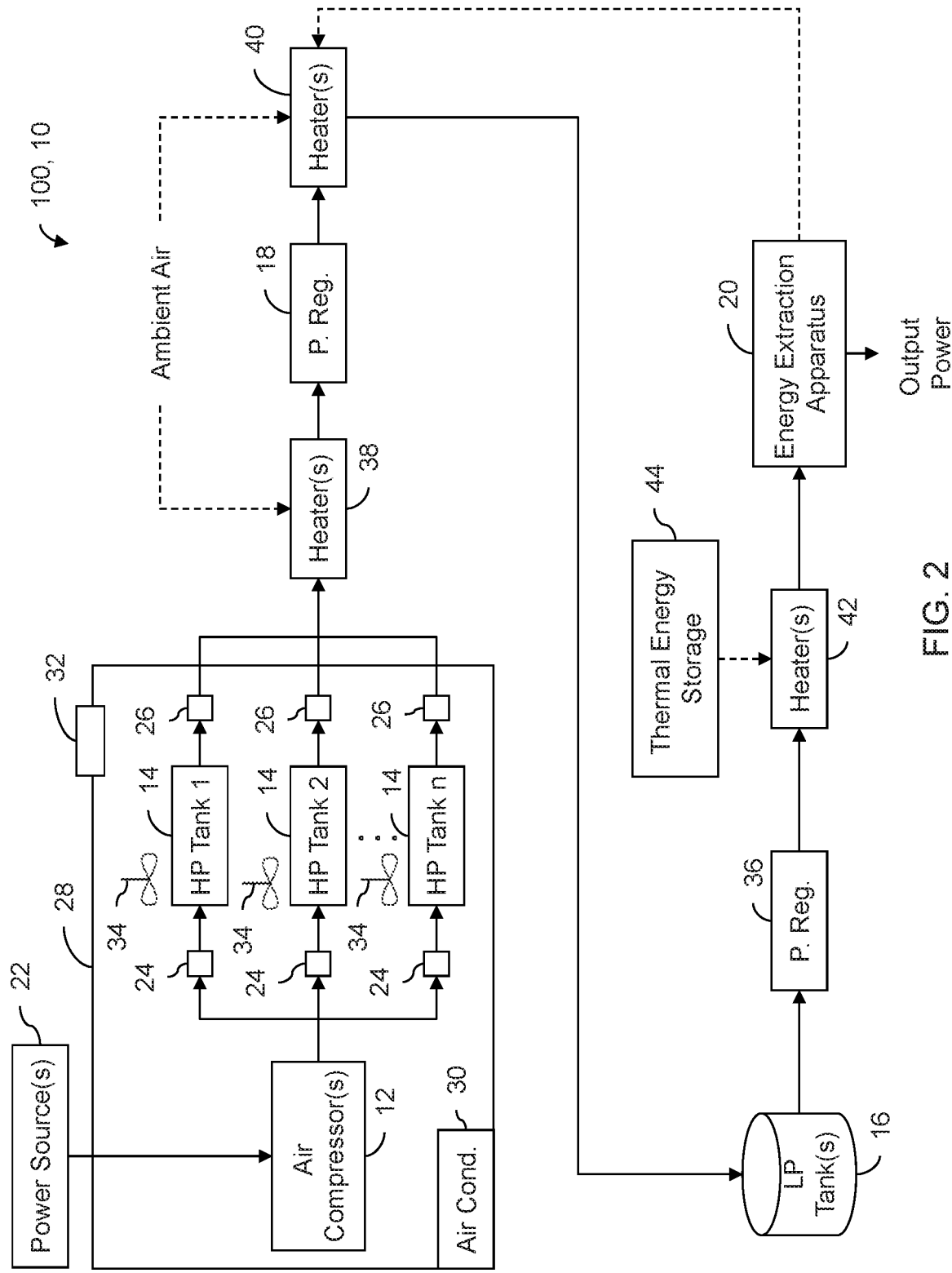
FIG. 2 is a schematic representation of an exemplary compressed air energy system according to another embodiment of the present disclosure.

FIG. 2 is a schematic representation of an exemplary compressed air energy system 100, 10 according to another embodiment of the present disclosure. Energy system 100, 10 may comprise components of energy system 10 illustrated in FIG. 1 so like elements have been labelled using like reference numerals.

As mentioned above, energy system 100, 10 may comprise a plurality of HP tanks 14 where the number of HP tanks 14 may be selected based on the desired amount of compressed air to be stored. In some embodiments, each of the plurality of HP tanks 14 may be associated with its own air compressor 12. Alternatively, one air compressor 12 may be associated with two or more HP tanks 14. For example, one air compressor 12 may be used to sequentially or simultaneously fill two or more HP tanks 14 and the selective connection between one or more HP tanks 14 and air compressor(s) 12 may be achieved via one or more inlet valves 24. Similarly, the transfer of compressed air from the plurality of HP tanks 14 to the one or more LP tanks 16 may be conducted sequentially or simultaneously and the selective connection between one or more HP tanks 14 and LP tank(s) 16 may be achieved via one or more outlet valves 26. Inlet valve(s) 24 may be of known or other type and may be configured to control (e.g., stop or permit in an ON/OFF manner) a flow of air between air compressor(s) 12 and HP tank(s) 14. Outlet valve(s) 26 may also be of known or other type and may be configured to control (e.g., stop or permit in an ON/OFF manner) a flow of air between HP tank(s) 14 and LP tank(s) 16.

Energy system 100, 10 may comprise enclosure 28 for housing air compressor 12 and/or HP tank 14. For example, a single enclosure 28 may house both air compressor 12 and HP tank 14. Alternatively, separate enclosures 28 may house air compressor 12 and HP tank 14. For example, in some embodiments, HP tank 14 may be disposed above ground or underground. Enclosure 28 may be climate-controlled. For example one or more air conditioning units 30 may be associated with enclosure 28 so as to actively control a temperature and/or a humidity level inside of enclosure 28. Enclosure 28 may comprise a suitable building defining an internal space that may be at least partially climate-controlled.

Air compressor 12 may be disposed inside enclosure 28 or may be disposed outside of enclosure 28 while still drawing air from the climate-controlled space inside of enclosure 28. Accordingly, depending on the amount air expected to be compressed and the construction of enclosure 28, air inlet 32 may be provide to permit air from the exterior of enclosure 28 to be supplied to enclosure 28 in order to replenish the air that is being drawn by air compressor 12 during operation. The use of air conditioning unit 30 may cause a humidity level in the air inside of enclosure 28 to be reduced in comparison with that of the outside environment. As a result the amount of moisture in the air drawn by air compressor 12 may be reduced also in comparison with an amount of moisture that would otherwise be drawn if unconditioned ambient air outside of enclosure 28 was used. This arrangement may also reduce the requirements for air dryers and/or moisture removal equipment from HP tank 14, LP tank 16 and/or other parts of energy system 100, 10. However, even though this arrangement may reduce the amount of moisture drawn into energy system 100, 10, moisture handling equipment (e.g., air dryers, drains) may still be required in some part(s) of system 100, 10. Such moisture handling equipment will be known to those skilled in the relevant arts and are not described further herein.

During the charging (i.e., filling) of HP tank 14 using air compressor 12, heat may be generated inside of enclosure 28 by the operation of air compressor 12 and also by the compression of air inside of HP tank 14. Accordingly, air conditioning unit 30 may be used to remove heat from the inside of enclosure 28 during the charging of HP tank 14 by providing cooling capacity. One or more fans 34 may be provided to cause circulation of air inside of enclosure 28. The circulation of air inside of enclosure 28 may promote the removal of heat from air compressor 12 and/or HP tank 14 by promoting heat transfer by convection. In some embodiments, fans 34 may cause air circulation in the vicinity/around HP tank 14.

Conversely, during the discharge of HP tank 14, the reduction in pressure inside of HP tank 14 as the compressed air is transferred to LP tank 16 via outlet valve 26 may cause an associated drop in temperature of the compressed air in HP tank 14. Accordingly, air conditioning unit 30 may be used to add heat to the inside of enclosure 28 during the discharging of HP tank 14 by providing heating capacity. Fans 34 may again cause circulation of air inside of enclosure 28 so as to promote the addition of heat to the air inside of HP tank 14 by promoting heat transfer by convection. The addition of heat to the compressed air being discharged from HP tank 14 may reduce the temperature drop that would otherwise be encountered and may also add to the amount of energy that may be extracted by energy extraction apparatus 20 depending on the amount of added heat is still present in the compressed air by the time it has reached energy extraction apparatus 20. In some embodiments, suitable control means may be used to automatically activate one or more of fans 34 when HP tank 14 is being discharged. The automatic activation of fan(s) 34 could be based on a sensed temperature (e.g., of the compressed air or of HP tank 14) or based on the opening of outlet valve 26.

Energy system 100, 10 may comprise pressure regulator 36 operatively disposed between the LP tank 16 and energy extraction apparatus 20. Pressure regulator 36 may be configured to control a flow of compressed air from LP tank 16 to energy extraction apparatus 20. For example, pressure regulator 36 may be configured to substantially maintain a third pressure at or near an inlet of energy extraction apparatus 20 so as to step down the pressure from the second pressure of LP tank 16 to the third pressure that is suitable for energy extraction apparatus 20. The magnitude of the third pressure may depend on the specific application and process parameters. In some embodiments, the third pressure may be between about 50 psi (0.3 MPa) and 250 psi (1.7 MPa) in cases where energy extraction apparatus 20 comprises one or more air turbines.

Energy system 100, 10 may also comprise one or more heaters 38, 40, 42 configured to add heat to the compressed air at one or more locations downstream of the LP tank 14. As described above, the addition of heat to the compressed air may increase the amount of energy that may be extracted by energy extraction apparatus 20. Heater(s) 38, 40, 42 may comprise suitable heat exchangers that may be configured to transfer heater from a working fluid to the compressed air. The same or different sources of heat may be used to transfer heat to the compressed air via heater(s) 38, 40, 42. In some embodiments, different sources of heat may be used in conjunction with different heaters 38, 40, 42 depending on the location of the respective heater 38, 40 42 in system 100, 10. Examples, of suitable sources of heat for one or more of heaters 38, 40, 42 may include ambient air, waste heat from energy extraction apparatus 20 and one or more thermal energy storage devices (referred hereinafter as "thermal energy storage device 44").

Thermal energy storage device 44 may be used to store heat obtained from power source 22 or other source(s) of power such as excess power available from an electric utility during off-peak times. Alternatively, thermal energy storage device 44 may receive heat from the combustion of natural gas (i.e., flare gas) or may receive waste heat from another related or unrelated process. Accordingly, thermal energy storage device 44 may be configured to store heat and release the heat at a later time. In some embodiments, thermal energy storage device 44 may be charged while HP tank 14 is also being charged, and, may be discharged while HP tank 14 is also being discharged. Thermal energy storage device 44 may comprise a medium configured to hold heat such as molten salt, steam, oil and/or water for example.

With respect to the location of heater 38 within system 100, 10, it may be disposed upstream of pressure regulator 18 (i.e., between HP tank 14 and pressure regulator 18). After charging of HP tank 14, it may be expected that the temperature of the compressed air inside of HP tank 14 will be close to or slightly higher than the ambient temperature inside of enclosure 28 if enough time has passed to permit the temperature of the stored compressed air to stabilize. However, as the compressed air is released from HP tank 14, de-pressurized and transferred to LP tank 16, a corresponding reduction in temperature may occur. Accordingly, the de-pressurization of the compressed air may cause the temperature of the compressed air to become significantly lower than an ambient temperature inside of enclosure 28 and/or outside of enclosure 28. For example, in some embodiments, the temperature of the compressed air may start at around 40-50° F. (4-10° C.) in HP tank 14 and could reach about −150° F. (−101° C.) as it is depressurized in HP tank 14 and at the location of heater 38. The difference in temperature between the compressed air and the ambient air (i.e., outside air) may be sufficient for meaningful heat transfer to take place between the ambient air and the compressed air at this location. Accordingly, heater 38 may comprise a suitable heat exchanger configured to use ambient air as a working fluid and promote heat transfer from the ambient air to the compressed air. The addition of heat upstream of pressure regulator 18 may also protect pressure regulator 18 from exposure to very low (e.g., cryogenic) temperatures. The addition of heat at this location may cause the compressed air to be heated to a temperature of about 40° F. (4° C.), for example, under certain conditions.

With respect to the location of heater 40, it may be disposed between pressure regulator 18 and LP tank 16. At this location, the temperature of the compressed air may be higher than at the location of heater 38 due to the addition of heat by heater 38 (if present). However, in some situations (e.g., in the absence of heater 38), it may be appropriate to transfer heat from the ambient air to the compressed air at the location of heater 40. Alternatively or in addition, heater 40 may comprise a suitable heat exchanger configured to transfer waste heat from energy extraction apparatus 20 to the compressed air upstream of LP tank 16. For example, heater 40 may receive exhaust air discharged by energy extraction apparatus 20 as a working fluid for the purpose of adding heat to the compressed air at this location. The addition of heat at this location, may cause the compressed air to be heated to a temperature of about 100° F. (37° C.) for example under certain conditions.

With respect to the location of heater 42, it may be disposed at a location between LP tank 16 and energy extraction apparatus 20. For example, heater 42 may be disposed between pressure regulator 36 and energy extraction apparatus 20. Heater 42 may comprise a suitable heat exchanger configured to facilitate heat transfer from thermal energy storage device 44 to the compressed air. At this location, the temperature of the compressed air may, in some embodiments, be about 40° F. (4° C.) after having been discharged from LP tank 16 and heater 42 may cause the compressed air to be heated up to about 3,600° F. (1982° C.) or to some other suitable temperature. For example, such temperature may be up to about 200° F. (93° C.), up to about 400° F. (204° C.), up to about 1500° F. (815° C.) or up to about 3,600° F. (1982° C.) depending on the maximum operating temperature of energy extraction apparatus 20. As explained above, heat may be supplied to heater 42 from (e.g., molten salt) thermal energy storage device 44 or other suitable source.

System 100, 10 may also comprise one or more controllers (not shown) for controlling the operation of one or more parts of system 100, 10 based on sensed or other inputs/parameters. In light of the present disclosure, the implementation of such controller(s) will be apparent to one skilled in the relevant arts and is therefore not described further herein.

Figure 3:
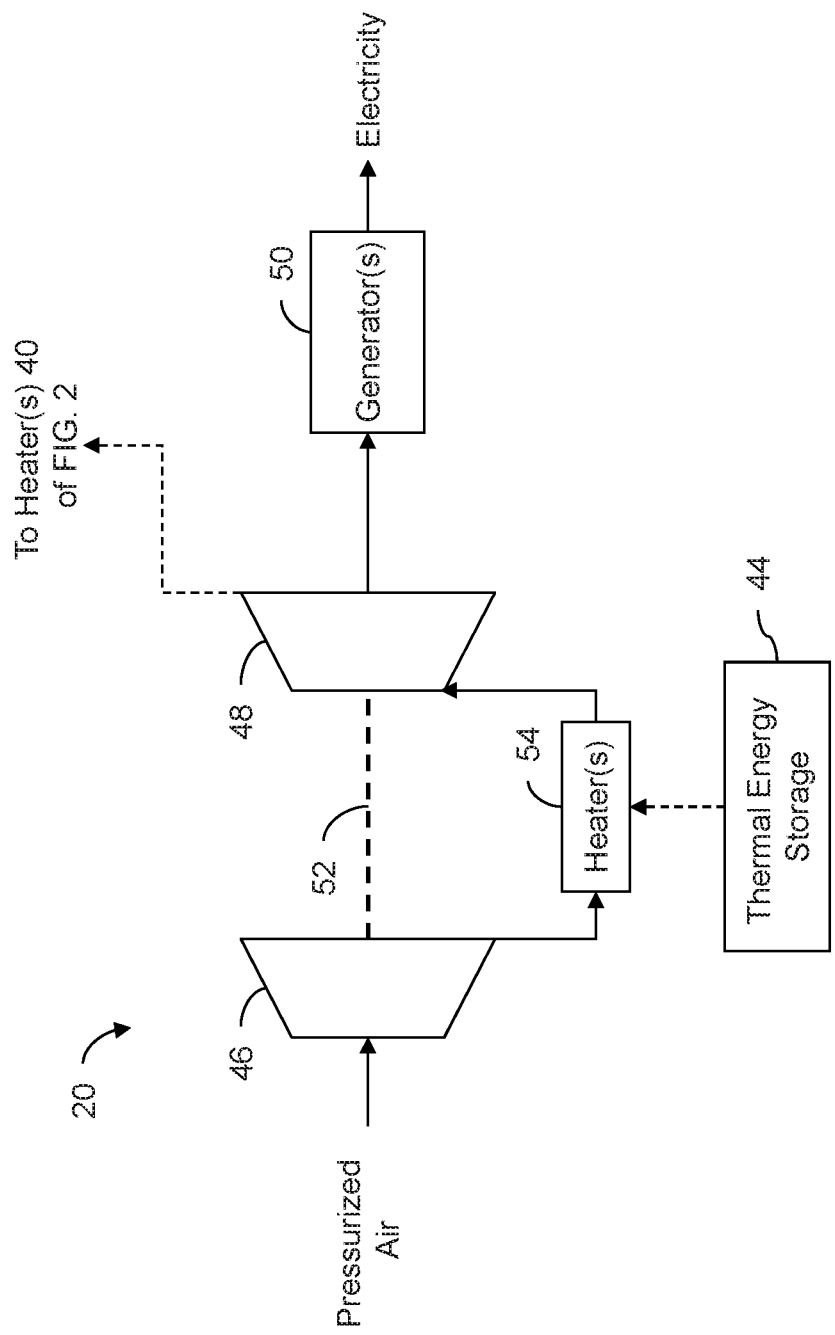
FIG. 3 is a schematic representation of an exemplary energy extraction apparatus of the compressed air energy systems of FIGS. 1 and 2.

FIG. 3 is a schematic representation of energy extraction apparatus 20 of compressed air energy systems 100, 10. Energy extraction apparatus 20 may comprises one or more air turbines 46, 48 and one or more electric generators 50 (referred hereinafter as "electric generator 50") operatively connected to the air turbines 46, 48. Air turbines 46, 48 may be considered multiple stages of the same turbine unit. Air turbines 46, 48 may be mechanically coupled together via shaft 52 for common rotation. Air turbines 46, 48 may be configured to extract mechanical energy from the compressed air that is delivered to them and the mechanical energy may be used to drive generator 50, which generates electricity. Air turbines 46, 48 and generator 50 may be of known or of other types. Air turbines 46, 48 may be arranged in series as shown in FIG. 3 or in parallel so as to receive compressed air at substantially the same pressure and temperature.

Energy system 100, 10 may also comprise heater 54 that may be configured to add heat to the compressed air at a location between turbines 46, 48. The addition of heat at this location may cause additional energy to be extracted from turbine 48 and also more heat available in the exhausted air available for heater 40. Heater 54 may also comprise a suitable heat exchanger configured to facilitate heat transfer from thermal energy storage device 44 or other source(s) of heat to the compressed air. For example, in some embodiments, the temperature of the compressed air at an outlet of first turbine 46 may be about 1,400° F. (760° C.) and heater 54 may be configured to increase the temperature of the compressed air so that the temperature of the air exhausted from second turbine 48 may still be about 1000° F. (538° C.) after having expanded through second turbine 48. In some embodiments, heater 54 may be configured to heat the compressed air back up to about 1,400° F. at the inlet of second turbine 48 so that the temperature of the compressed air at the inlet of first turbine 46 is substantially the same as the temperature of the compressed air at the inlet of second turbine 48.

During operation, system 100, 10 may be used for producing and storing compressed air and extracting energy from the compressed air at a later time. The compressed air may be produced and stored when energy production, by an electric utility (i.e. power company) for example, exceeds the demand and the energy from the compressed air may be extracted when the demand exceeds energy production. However, it is understood that system 100, 10 is not limited to such use.

Figure 4:
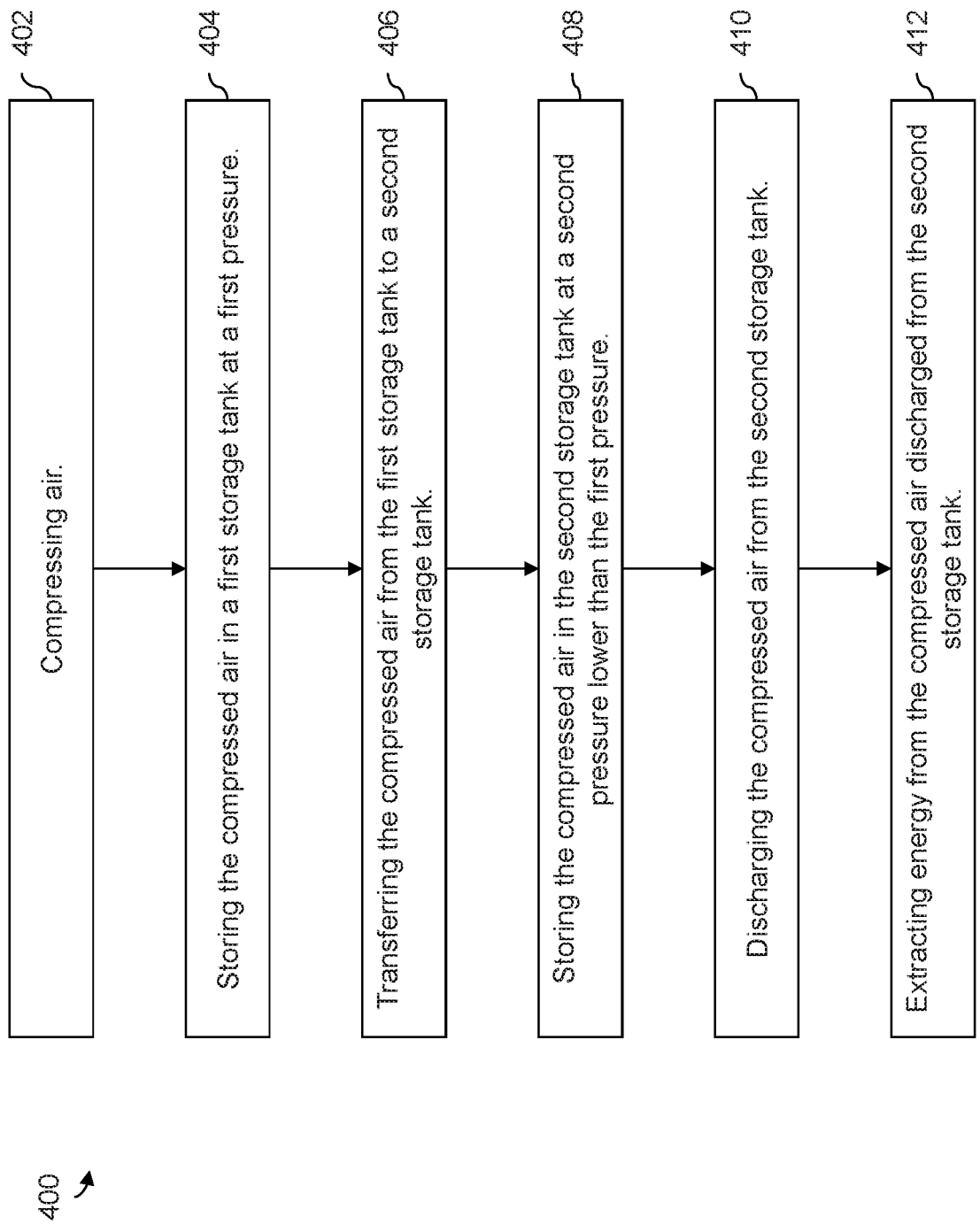
FIG. 4 is a flowchart of an exemplary method for storing compressed air and extracting energy from the compressed air.

FIG. 4 is a flowchart of a method 400 for storing compressed air and extracting energy from the compressed air. Method 400 may, for example, be conducted using system 100, 10 described above. Method 400 may comprise: compressing air (see block 402); storing the compressed air in a first storage tank (e.g., HP tank 14) at a first pressure (see block 404); transferring the compressed air from the first storage tank to a second storage tank (e.g., LP tank 16) (see block 406); storing the compressed air in the second storage tank at a second pressure lower than the first pressure (see block 408); discharging the compressed air from the second storage tank (see block 410); and extracting energy from the compressed air discharged from the second storage tank (see block 412).

As described above, a third pressure of the compressed air discharged from LP tank 16 may be between about 50 psi (0.3 MPa) and 250 psi (1.7 MPa). The first pressure of the compressed air in HP tank 14 may be about 1000 psi (6.9 MPa) or higher. For example, the first pressure may be between about 1000 psi (6.9 MPa) and about 3000 psi (20.7 MPa). The second pressure of the compressed air in LP tank 16 may be lower than 1000 psi (6.9 MPa) and may be as low as about 400 psi (2.7 MPa). For example, the second pressure may be between about 470 psi (3.2 MPa) and about 570 psi (3.9 MPa).

Method 400 may comprise storing the compressed air in a plurality of HP tanks 14 at the first pressure. Accordingly, method 400 may comprise individually transferring compressed air from each of the plurality of HP tanks 14 to LP tank 16.

Method 400 may comprise adding heat to the compressed air at one or more locations downstream of HP tank 14. For example, method 400 may comprise adding heat to the compressed air at a first of the locations, the first location being upstream of pressure regulator 18 operatively disposed between HP tank 14 and LP tank 16. Adding heat to the compressed air may comprise transferring heat from ambient air to the compressed air.

Method 400 may comprise adding heat to the compressed air at a second of the locations, the second location being between pressure regulator 18 and LP tank 16. Adding heat to the compressed air may comprise transferring heat from air discharged by energy extraction apparatus 20 to the compressed air.

Method 400 may comprise adding heat to the compressed air at a third of the locations, the third location being downstream of the LP tank 16. Adding heat to the compressed air may comprise transferring heat from (e.g., molten salt) thermal energy storage device 44 to the compressed air.

Method 400 may comprise adding heat to the compressed air at a fourth of the locations, the fourth location being between two air turbines 46, 48 that extract energy from the compressed air. Adding heat to the compressed air may comprise transferring heat from (e.g., molten salt) thermal energy storage device 44 to the compressed air.

Method 400 may comprise controlling a temperature of an ambient environment around the HP tank 14. Temperature control may be achieved using climate-controlled enclosure 28 and air conditioning unit 30. Method 400 may comprise controlling a humidity level in the air inside climate-controlled enclosure 28. Compressing air may comprise drawing air from inside climate-controlled enclosure 28 for pressurization so as to reduce an amount of moisture that would otherwise be drawn by air compressor 12.

Method 400 may comprise inducing air circulation around HP tank 14 using fan 34 for example to promote convective heat transfer.

Method 400 may comprise using one or more wind turbines or other renewable source(s) 22 of power for compressing the air.

The pressure values referenced in the examples below are absolute pressures.

Example 1—Temperature Drop in Storage Tank

As explained above, a temperature drop is typically associated with reducing the pressure of compressed air. Accordingly, as compressed air is discharged from HP tank 14 and/or LP tank 16, the temperature inside of the respective tanks may drop as the pressure inside the respective tanks decreases as a result of compressed air being discharged.

Figure 5:
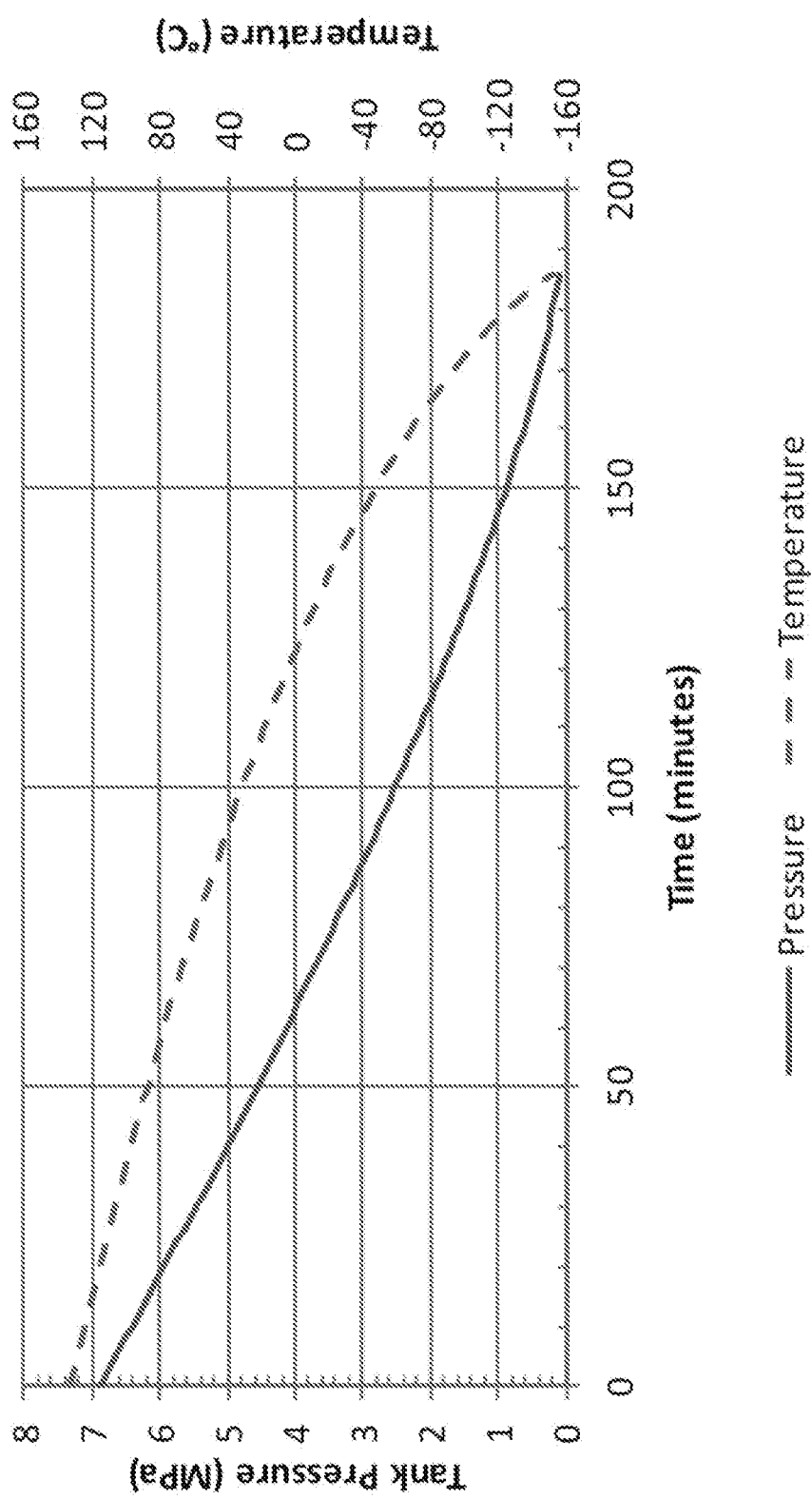
FIG. 5 is a graph showing theoretical pressures and temperatures over time in a pressure vessel containing compressed air as the compressed air is discharged at 1 kg/sec from 6,895 kPa and 132° C. under adiabatic and isentropic conditions.

FIG. 5 is a graph showing theoretical pressures and temperatures over time in a pressure vessel containing compressed air as the compressed air is discharged at 1 kg/sec from 6,895 kPa and 132° C. under adiabatic and isentropic conditions. The solid line represents absolute pressure in MPa and the stippled line represents temperature in ° C. For the purpose of FIG. 5, the discharge of the compressed air from the tank is assumed to be an adiabatic process (i.e. no heat transfer to or from the tank) and constant entropy. For a 198 m$^3$ (6,987 ft$^3$) tank charged to 6,895 kPa (1,000 PSI), initially at 132° C. (270° F.) and discharging at a rate of 1 kg/s (2.2 lb/s) this results in the temperature and pressure response shown in FIG. 5. The temperature drops 284° C. As the tank cools, this could be offset by facilitating heat transfer to the tank from the external ambient air but for the purpose of FIG. 5, an adiabatic tank was assumed as the worst case scenario (i.e., maximum temperature drop).

Example 2—Single Turbine with No Added Heat

This example presents results of numerical simulations associated with a single turbine (e.g., energy extraction apparatus 20) that is connected to receive compressed air being discharged from LP tank 16 through pressure regulator 36 without the addition of heat to the compressed air. For the purpose of this simulation, a turbine efficiency of 0.77 was used and the power extraction was set to 125 kW. The results assume a tank volume of 197.9 m³ (6987 ft³) initially charged to a pressure of 6,895 kPa (1,000 PSI).

Figure 6:
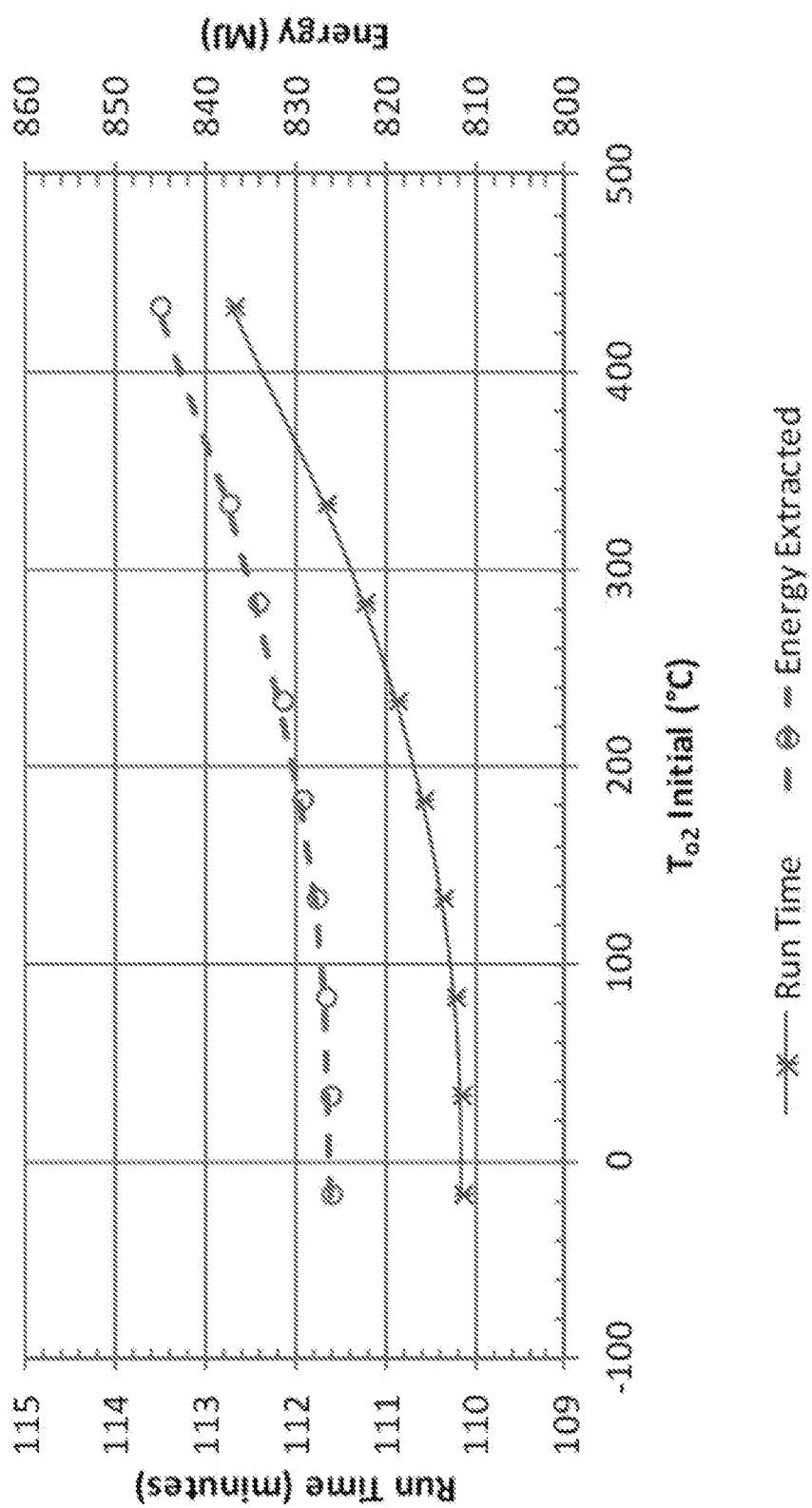
FIG. 6 is a graph illustrating the run time and energy extracted from a single turbine as a function of the initial temperature of the compressed air in a storage tank holding the compressed air.

The first parameter of interest was the air temperature in the tank which is also the air temperature at the turbine inlet. It was shown that if the inlet temperature ($T_{o2}$) to the turbine was maintained at the initial tank temperature this would have no significant effect on the total energy extracted from the turbine. However, FIG. 6 shows a graph illustrating the run time and energy extracted from the single turbine as a function of the initial temperature of the compressed air in a storage tank holding the compressed air. The solid line represents the run time and the stippled line represents the energy extracted. FIG. 6 shows that incorporating the decreasing tank temperature results in a slight increase in total energy extracted as the initial temperature is increased. As the power generated is fixed, the run time is directly proportional to the energy generated.

The increase in energy extracted is only 2.3% over the temperature range in FIG. 4. This indicates a possible secondary effect if using air directly from the tank. It should also be noted that due to the extremely low temperatures generated by the tank blow down and expansion through the turbine the simulation was conducted using air property calculations that are beyond the validated range of the correlations. The cryogenic temperatures of the compressed air could also entail practical implications requiring special considerations for the equipment that is exposed to such temperatures.

Figure 7:
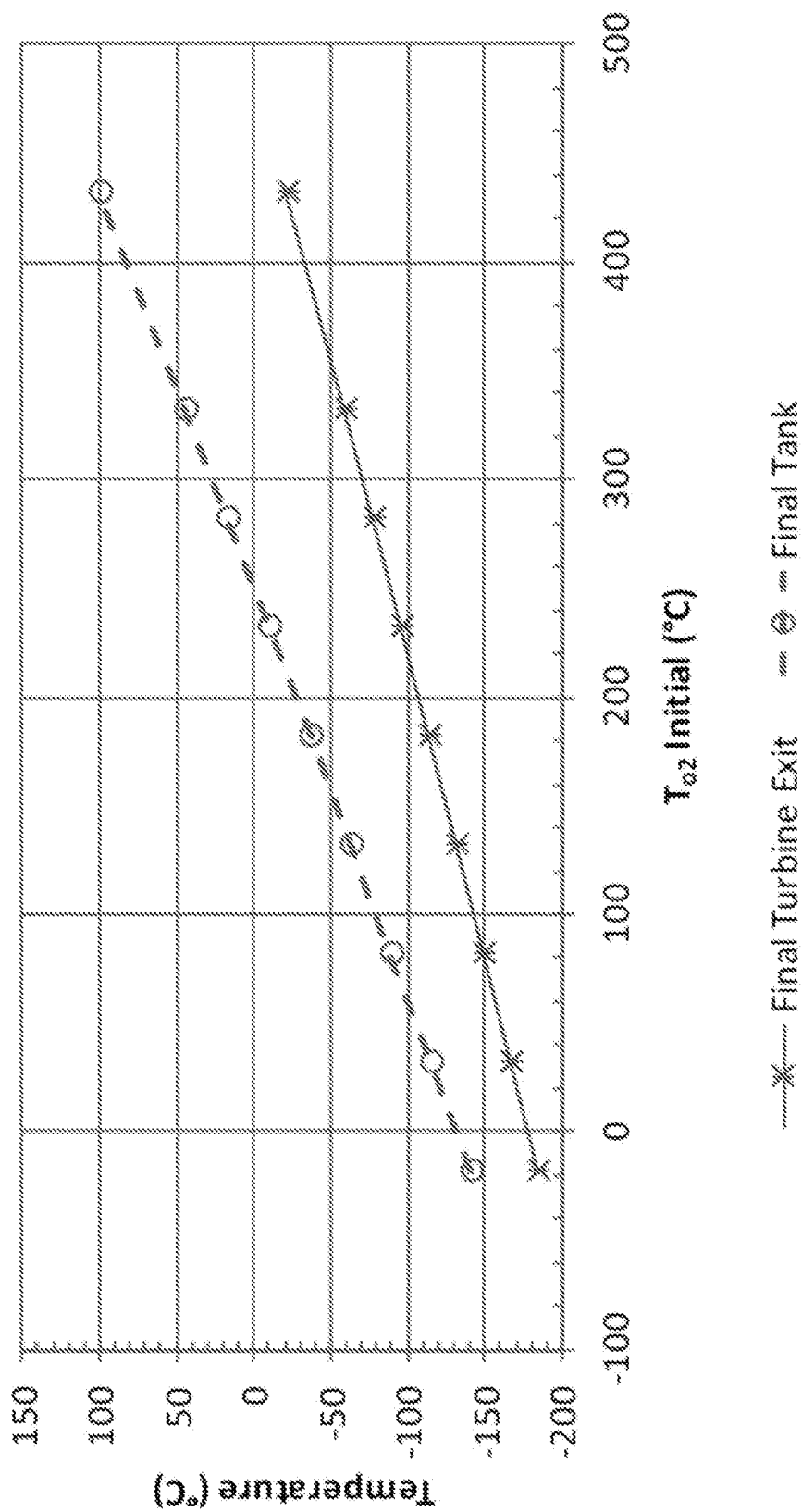
FIG. 7 is a graph illustrating the temperature at the exit of a storage tank and the temperature at the exit of a single turbine once the tank has been discharged (i.e., final temperatures) as a function of the initial temperature of the compressed air at the inlet of the turbine.

FIG. 7 is a graph illustrating the temperature at the exit of a storage tank and the temperature at the exit of a single turbine once the tank has been discharged (i.e., final temperatures) as a function of the initial temperature of the compressed air at the inlet of the turbine. The solid line represents the final temperature of the compressed air at the turbine exit and the stippled line represents the final temperature of the compressed air at the exit of the tank.

Figure 8:
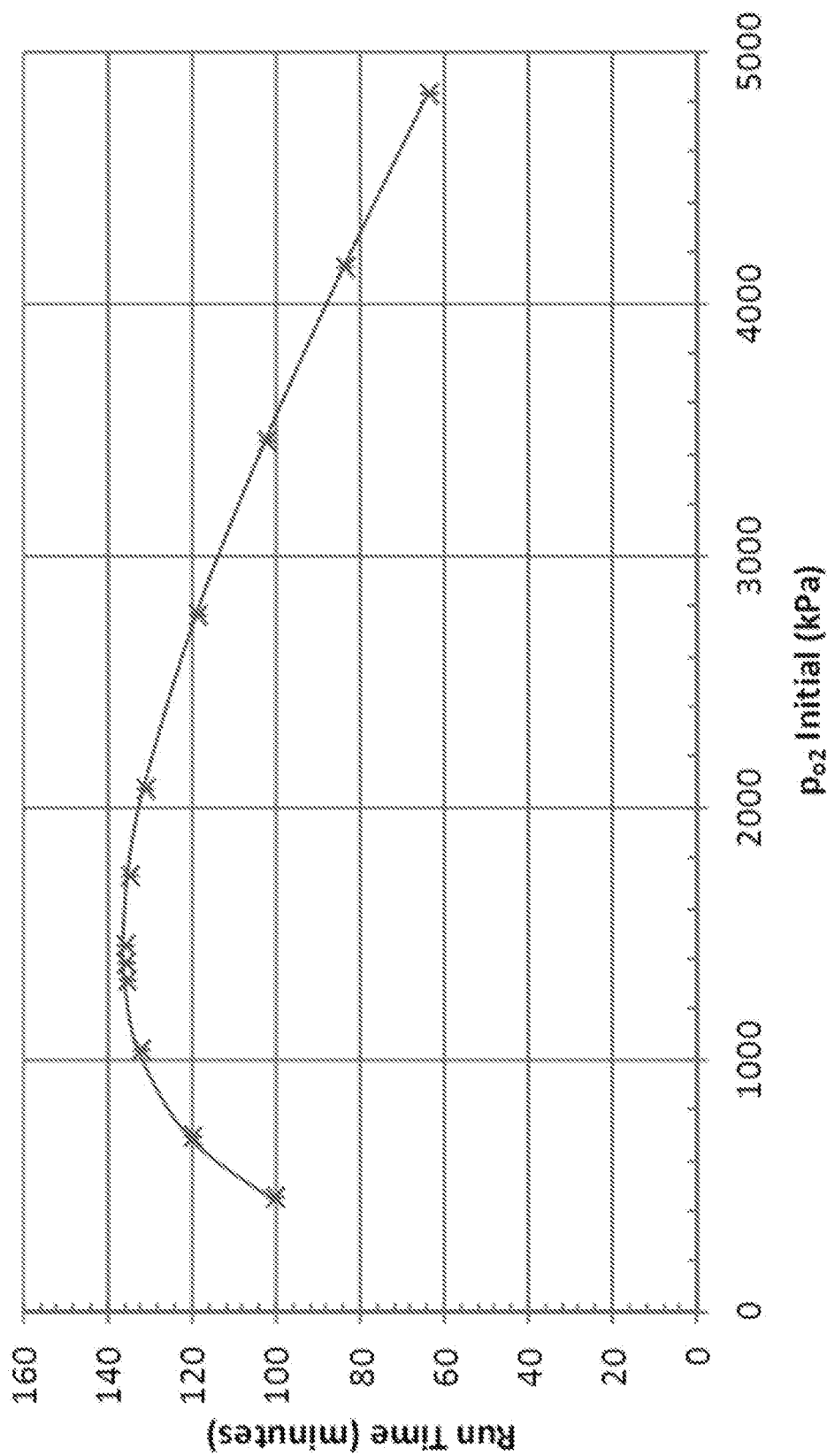
FIG. 8 is a graph illustrating the run time and energy extracted with the single turbine as a function of initial turbine inlet pressure.

FIG. 8 is a graph illustrating the run time and energy extracted with a single turbine as a function of the initial turbine inlet pressure. FIG. 8 shows that changing the inlet pressure to the turbine also effects the run time. As the pressure ratio increases the energy extraction also increases, allowing for longer operation at a fixed power level. However, if the turbine requires a higher pressure ratio, the residual mass in the tank at the end is higher which reduces the running time. While the run time reaches a maximum around 1,400 kPa a pressure ratio of 14 may not be practical in some applications with the size of system and inlet temperatures desired. Changing the initial tank charge pressure may affect the location of this peak. If the pressure is increased, the relative mass in the tank at the end is decreased and therefore will move the peak to a higher pressure.

Example 3—Single Turbine with Inlet Air Heated

This example presents results of numerical simulations associated with a single turbine (e.g., energy extraction apparatus 20) that is connected to receive compressed air being discharged from LP tank 16 through pressure regulator 36 with the use of heater 42 (see FIG. 2) for heating the compressed air before it enters the turbine. For the purpose of this simulation, a turbine efficiency of 0.77 was used and the power extraction was set to 125 kW. The results assume a tank volume of 197.9 m³ (6987 ft³) initially charged to a pressure of 6,895 kPa (1,000 PSI).

Figure 9:
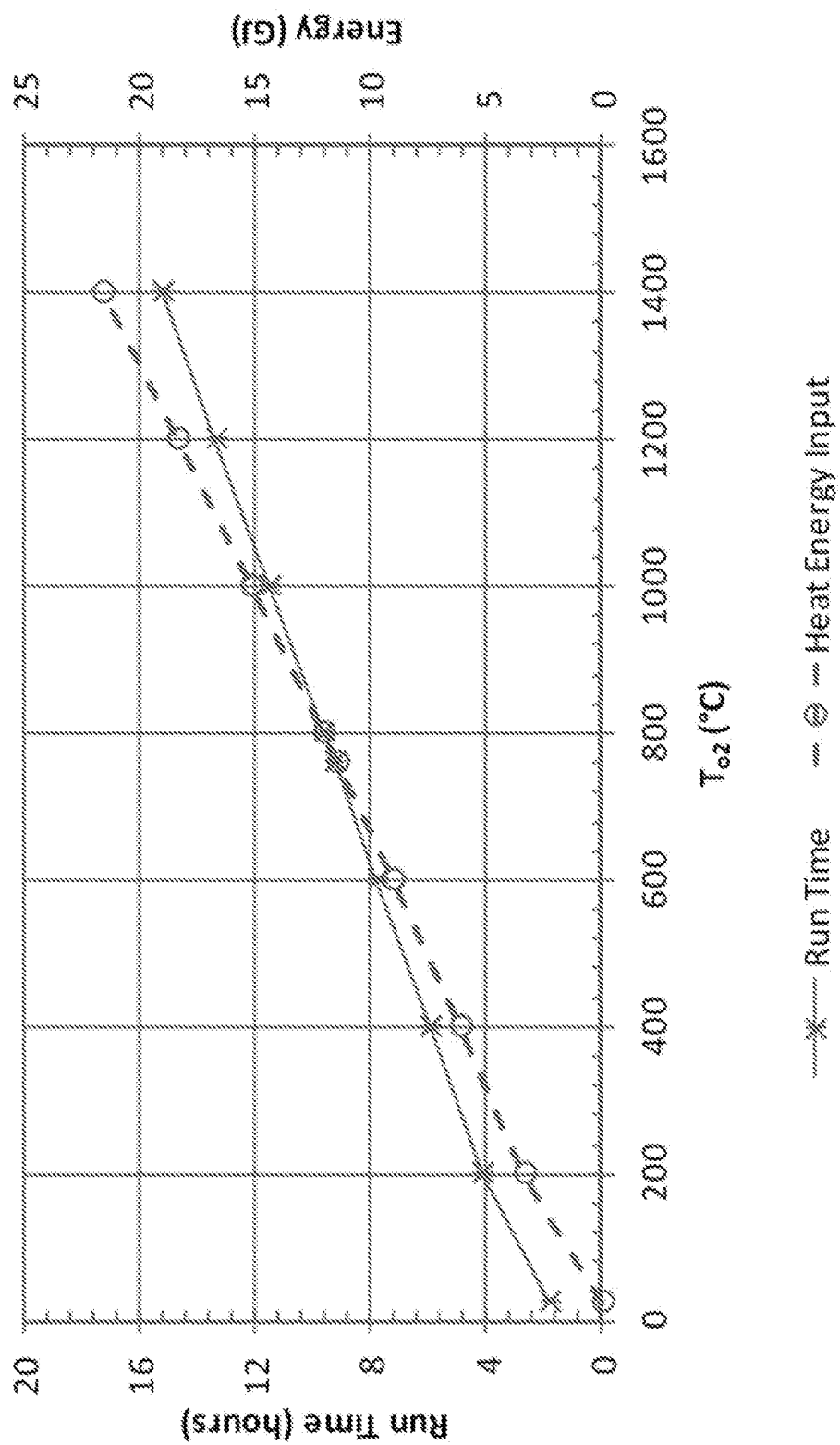
FIG. 9 is a graph illustrating the run time and heat input to the compressed air with an initial tank temperature of 25° C. as a function of inlet temperature of the single turbine.

FIG. 9 is a graph illustrating the run time and heat input to the compressed air with an initial tank temperature of 25° C. as a function of inlet temperature ($T_{o2}$). The compressed air is heated after leaving the tank but prior to entering the turbine. This could be done with an externally powered heat exchanger or an externally powered heat exchanger preceded by a recuperator, which transfers heat from the turbine exhaust to the inlet air stream. For this system it was assumed that the heat exchanger would maintain a constant outlet temperature as the tank temperature decreases. This results in constant turbine operation as both inlet pressure and temperature are constant. The variation in tank temperature only affects the energy required to heat the inlet air. The simulation assumed an initial tank temperature of 25° C.

FIG. 9 shows that as the inlet temperature is increased so is the heat required and the running time. The running time is now scaled in hours as the increase in inlet temperature very significantly extends the running time. A reasonable turbine inlet temperature may be around 800° C., yielding nearly 10 hours of operation.

Example 4—Two Turbines with Re-Heat

This example presents results of numerical simulations associated with two turbines turbine (e.g., turbines 46 and 48 of energy extraction apparatus 20) that are connected to receive compressed air being discharged from LP tank 16 through pressure regulator 36 with the use of heater 42 (see FIG. 2) for heating the compressed air before it enters the first turbine. Heater 54 (see FIG. 3) is also used to re-heat the compressed air between the two turbines. For the purpose of this simulation, a turbine efficiency of 0.77 was used and the power extraction was set to 125 kW. The results assume a tank volume of 197.9 m³ (6987 ft³) initially charged to a pressure of 6,895 kPa (1,000 PSI).

Since this system requires two turbines and an additional heat exchanger to reheat the air between the two turbines, the capital and maintenance costs will be higher. The advantages are the ability to use higher overall pressure ratios, increased running time and improve the overall efficiency. If the air is heated prior to the first turbine and then reheated to the same temperature prior to the second turbine, the results presented in FIG. 10 may be obtained.

Figure 10:
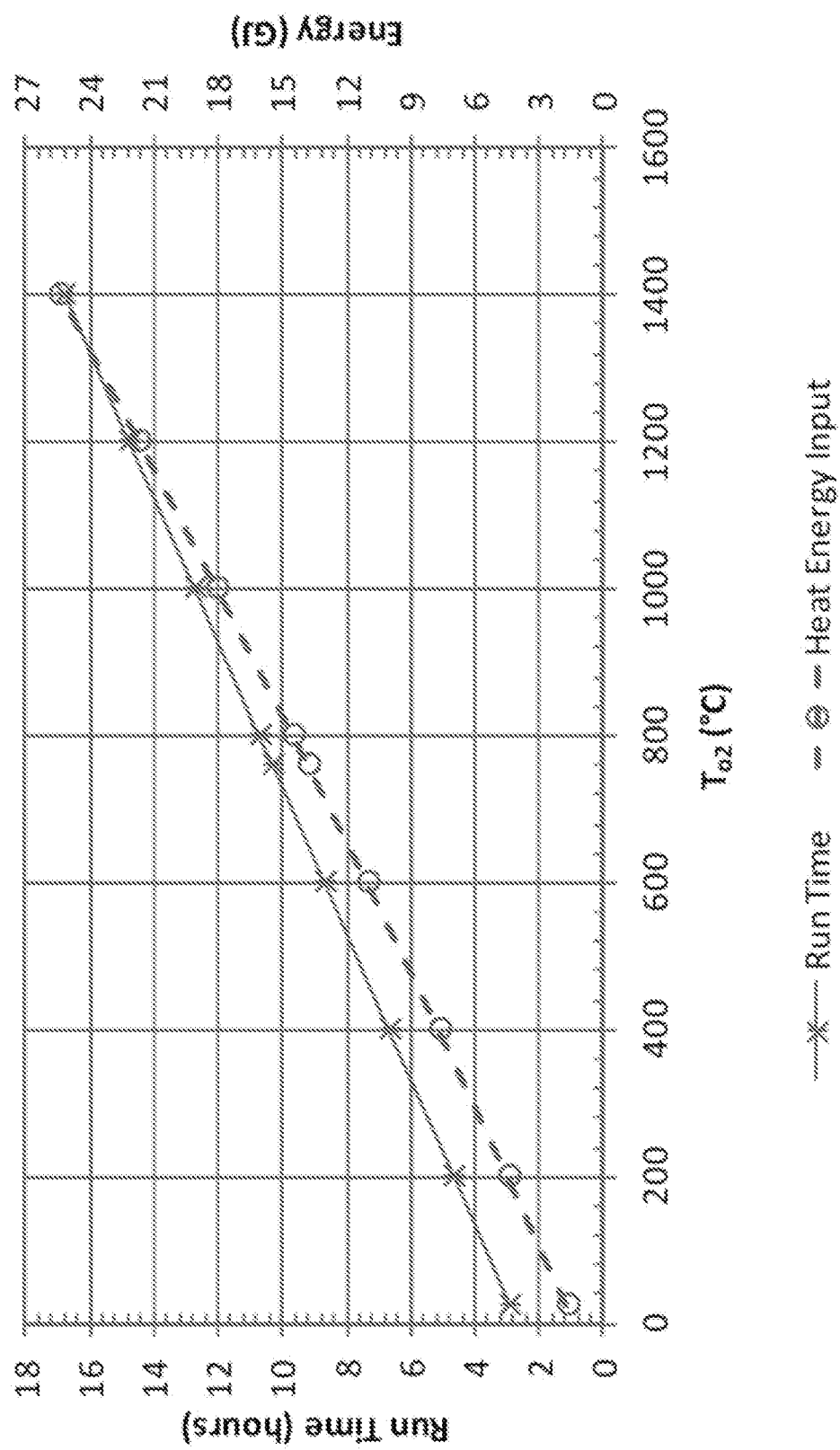
FIG. 10 is a graph illustrating the heat input and run time for an energy extraction apparatus comprising two turbines with heat added to the compressed air between the two turbines with an initial tank temperature of 25° C. and a turbine inlet pressure of 552 kPa, as a function of turbine inlet temperature.

FIG. 10 is a graph illustrating the heat input and run time for an energy extraction apparatus comprising two turbines with heat added to the compressed air between the two turbines with an initial tank temperature of 25° C. and a turbine inlet pressure of 552 kPa as a function of turbine inlet temperature. The solid line represents the run time and the stippled line represents the energy input. With the same inlet pressure as used in FIG. 9 there is a small increase in run time but also an increase in energy required. However, with two turbine stages it is possible to increase the inlet pressure to the first stage and still maintain relatively low pressure ratios across each stage. By increasing the inlet pressure to 1,400 kPa, which is near the optimal pressure in FIG. 8, and reheating the compressed air between the two turbines, the results shown in FIG. 11 may be obtained.

Figure 11:
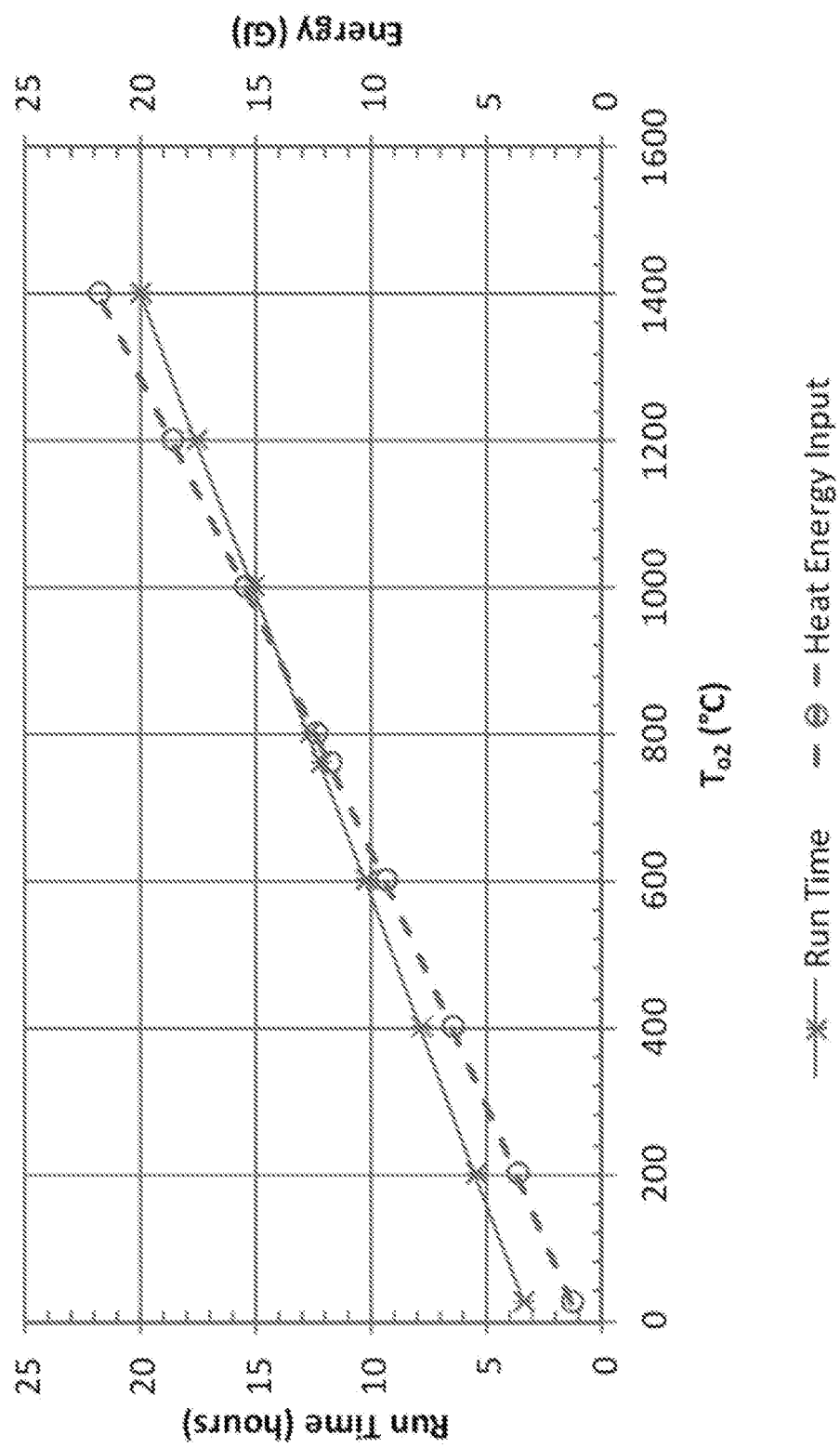
FIG. 11 is a graph illustrating the heat input between the two turbines and associated run time for an initial tank temperature of 25° C. and a turbine inlet pressure of 1,400 kPa as a function of turbine inlet temperature.

FIG. 11 is a graph illustrating the heat input between the two turbines and associated run time for an initial tank temperature of 25° C. and a turbine inlet pressure of 1,400 kPa as a function of turbine inlet temperature. The solid line represents the run time and the stippled line represents the energy input. This demonstrates a significantly extended run time and a decrease in heat energy required for a given run time.

Based on the results presented in the above examples, increasing the temperature and pressure at the turbine inlet causes an increase in the power extracted for a given air flow but are limited by practical considerations due to the cryogenic temperatures involved. Likewise, a two stage system with reheat was shown to have increased efficiency and power extraction but would require higher capital investment and maintenance costs than an energy extraction apparatus having only a single turbine.

The above description is meant to be exemplary only, and one skilled in the relevant arts will recognize that changes may be made to the embodiments described without departing from the scope of the invention disclosed. For example, the blocks and/or operations in the flowcharts and drawings described herein are for purposes of example only. There may be many variations to these blocks and/or operations without departing from the teachings of the present disclosure. For instance, the blocks may be performed in a differing order, or blocks may be added, deleted, or modified. The present disclosure may be embodied in other specific forms without departing from the subject matter of the claims. Also, one skilled in the relevant arts will appreciate that while the systems disclosed and shown herein may comprise a specific number of elements/components, the systems could be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A compressed air energy system for storing compressed air and extracting energy from the compressed air, the system comprising:
   an air compressor;
   a storage tank connected to the air compressor for receiving compressed air from the air compressor and storing the compressed air;
   an energy extraction apparatus configured to extract energy from the compressed air discharged from the storage tank;
   a pressure regulator operatively disposed between the storage tank and the energy extraction apparatus, the pressure regulator being configured to control a flow of compressed air from the storage tank toward the energy extraction apparatus;
   a first heater configured to add heat to the compressed air at a location between the storage tank and the pressure regulator; and
   a second heater configured to add heat to the compressed air at a location between the pressure regulator and the energy extraction apparatus, the second heater being configured to facilitate heat transfer from air discharged by the energy extraction apparatus to the compressed air.

2. The system as defined in claim 1, wherein the first heater is configured to facilitate heat transfer from ambient air to the compressed air.

3. The system as defined in claim 2, comprising a third heater configured to add heat to the compressed air at a location between the second heater and the energy extraction apparatus.

4. The system as defined in claim 3, wherein the third heater is configured to facilitate heat transfer from natural gas combustion to the compressed air.

5. The system as defined in claim 1, wherein the first heater is configured to facilitate heat transfer from air discharged by the energy extraction apparatus to the compressed air.

6. The system as defined in claim 5, comprising a third heater configured to add heat to the compressed air at a location between the second heater and the energy extraction apparatus, the third heater being configured to facilitate heat transfer from natural gas combustion to the compressed air.

7. The system as defined in claim 1, comprising a climate-controlled enclosure, the compressor having an air inlet configured to receive air from inside the climate-controlled enclosure.

8. The system as defined in claim 7, comprising an air conditioning unit associated with the enclosure to actively control a humidity level inside of the enclosure.

9. The system as defined in claim 7, wherein the compressor and the storage tank are disposed inside the climate-controlled enclosure, and the energy extraction apparatus is disposed outside of the climate-controlled enclosure.

10. The system as defined in claim 1, wherein:
    the storage tank is a first storage tank storing the compressed air at a first pressure;
    the system includes a second storage tank connected to the first storage tank for receiving the compressed air from the first storage tank and storing the compressed air at a second pressure;
    the pressure regulator is disposed between the first storage tank and the second storage tank, the pressure regulator being configured to control a flow of compressed air from the first storage tank to the second storage tank to maintain the second pressure in the second storage tank lower than the first pressure in the first storage tank; and
    the energy extraction apparatus is configured to extract energy from the compressed air discharged from the second storage tank.

11. The system as defined in claim 10, wherein the first heater is configured to facilitate heat transfer from ambient air to the compressed air.

12. The system as defined in claim 10, wherein the second heater is configured to add heat to the compressed air at a location between the pressure regulator and the second storage tank.

13. The system as defined in claim 12, comprising a third heater configured to add heat to the compressed air at a location between the second storage tank and the energy extraction apparatus.

14. The system as defined in claim 13, wherein:
    the pressure regulator is a first pressure regulator;
    the system includes a second pressure regulator operatively disposed between the second storage tank and the energy extraction apparatus;

the second pressure regulator is configured to control a flow of compressed air from the second storage tank toward the energy extraction apparatus; and the third heater configured to add heat to the compressed air at a location between the second pressure regulator and the energy extraction apparatus.

15. The system as defined in claim 14, wherein the third heater is configured to facilitate heat transfer from natural gas combustion to the compressed air.

16. The system as defined in claim 10, wherein the first heater is configured to facilitate heat transfer from air discharged by the energy extraction apparatus to the compressed air.

17. The system as defined in claim 16, comprising a third heater configured to add heat to the compressed air at a location between the second storage tank and the energy extraction apparatus, the third heater being configured to facilitate heat transfer from natural gas combustion to the compressed air.

18. The system as defined in claim 10, comprising a climate-controlled enclosure, the compressor having an air inlet configured to receive air from inside the climate-controlled enclosure.

19. The system as defined in claim 18, wherein the compressor and the first storage tank are disposed inside the climate-controlled enclosure, and the second storage tank is disposed outside of the climate-controlled enclosure.

20. The system as defined in claim 19, comprising a fan configured to induce air circulation around the first storage tank.

21. A method for storing compressed air and extracting energy from the compressed air, the method comprising:

compressing air;

storing the compressed air in a storage tank;

discharging the compressed air from the storage tank;

using a turbine to extract energy from the compressed air discharged from the storage tank;

using a first heat exchanger to facilitate heat transfer from ambient air to the compressed air discharged from the storage tank at a first location upstream of the turbine; and using a second heat exchanger to facilitate heat transfer from air discharged by the turbine to the compressed air discharged from the storage tank at a second location upstream of the turbine, the second location being downstream of the first location.

22. The method as defined in claim 21, comprising using a third heat exchanger to facilitate heat transfer from natural gas combustion to the compressed air discharged from the storage tank at a third location upstream of the turbine, the third location being downstream of the second location.

* * * * *